United States Patent
Salmi et al.

(10) Patent No.: US 7,111,737 B2
(45) Date of Patent: Sep. 26, 2006

(54) METHOD AND A STATION FOR CHECKING THE INTEGRITY OF PACKAGES, IN PARTICULAR SINGLE-DOSE PACKAGES

(75) Inventors: Gianfranco Salmi, Bologna (IT); Stefano Maccaferri, Funo (Bologna) (IT)

(73) Assignee: I.M.A. Industria Macchine Automatiche, Ozzano Emilia (IT)

( * ) Notice: Subject to any disclaimer, the term of this patent is extended or adjusted under 35 U.S.C. 154(b) by 0 days.

(21) Appl. No.: 10/480,500

(22) PCT Filed: Jun. 11, 2002

(86) PCT No.: PCT/IB02/02133

§ 371 (c)(1),
(2), (4) Date: Mar. 8, 2004

(87) PCT Pub. No.: WO02/100724

PCT Pub. Date: Dec. 19, 2002

(65) Prior Publication Data

US 2004/0134840 A1    Jul. 15, 2004

(30) Foreign Application Priority Data

Jun. 12, 2001 (IT) .......................... BO2001A0371

(51) Int. Cl.
B07C 5/34 (2006.01)
G01M 3/00 (2006.01)
(52) U.S. Cl. ................. 209/3; 209/599; 73/45
(58) Field of Classification Search ........... 209/3, 209/552, 593, 599, 651, 699, 936; 73/41, 73/45 X, 49.3
See application file for complete search history.

(56) References Cited

U.S. PATENT DOCUMENTS 3,771,649 A * 11/1973 Strauss .................. 209/3.1
3,825,750 A * 7/1974 Hayase et al. ........... 250/223 R (Continued)

FOREIGN PATENT DOCUMENTS

JP        402290526 A  * 11/1990 ............ 73/49.3
WO       WO 00/73760 A2    12/2000

OTHER PUBLICATIONS

English Translation of JP 02-290526, published Nov. 30, 1990, inventor Shibazaki Hisaichi.*

*Primary Examiner*—Joseph C. Rodriguez
(74) *Attorney, Agent, or Firm*—William J. Sapone; Coleman Sudol Sapone P.C.

(57) ABSTRACT

A method and work station (SV) for checking the integrity of packages (2), in particular single-dose packages uses a first pressing device (4) for applying a reference force to one or a group of packages (2) for a predetermined time interval (Dt). The value of the force transmitted by the package (2) is detected using one or more load cells (6) positioned opposite to the first pressing device (4) with respect to the package (2). The load cells detect the force transmitted through the package. Packages are rejected when the value of the force transmitted by the package (2) is lower than a critical force value (f*) which is a value of the force transmitted to the load cells by a good package. Before using the first pressing device for applying the reference force, a second pressing device is used to apply a test force to the package (2) for a time interval (Dt*) for preliminarily stressing the package (2) before the load cells detect the value of the force transmitted by the package (2) in response to the force applied by the first pressing device.

18 Claims, 1 Drawing Sheet

U.S. PATENT DOCUMENTS

| | | | |
|---|---|---|---|
| 3,918,293 A * | 11/1975 | Feigel | 73/49.3 |
| 4,148,213 A | 4/1979 | Prakken | |
| 4,510,730 A * | 4/1985 | Edmondson | 53/53 |
| 4,649,740 A * | 3/1987 | Franklin | 73/49.3 |
| 5,531,101 A | 7/1996 | Fenlon | |
| 5,542,288 A * | 8/1996 | Fenlon | 73/49.3 |
| 5,786,530 A * | 7/1998 | Fenlon | 73/49.3 |
| 6,439,032 B1 * | 8/2002 | Lehmann | 73/49.3 |
| 2003/0094404 A1 * | 5/2003 | Kvisgaard et al. | 209/645 |

* cited by examiner

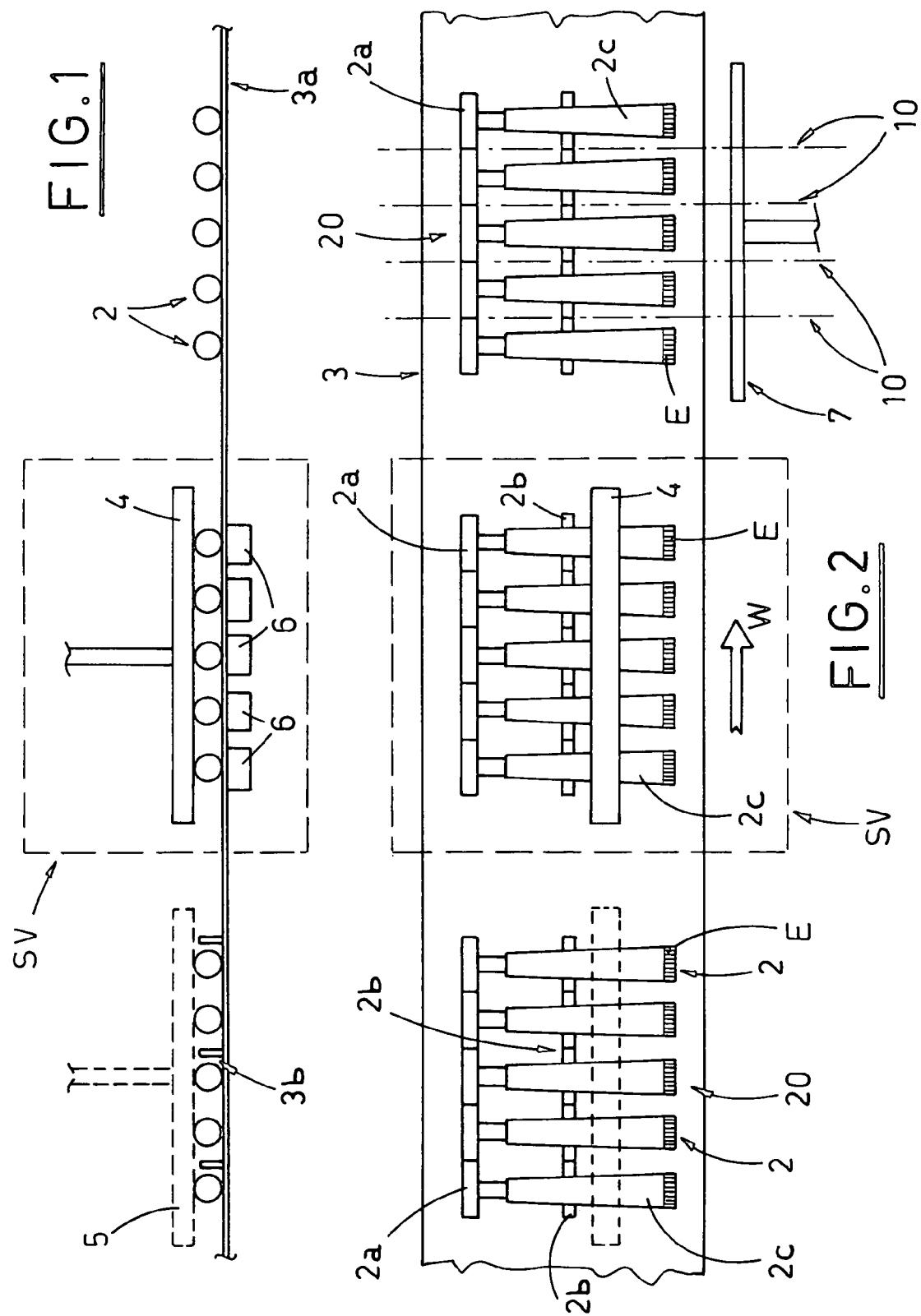

METHOD AND A STATION FOR CHECKING THE INTEGRITY OF PACKAGES, IN PARTICULAR SINGLE-DOSE PACKAGES

FIELD OF THE INVENTION

The present invention relates to the technical field concerning checking the integrity of packages, especially those containing a pharmaceutical product.

In particular, the present invention relates to a method for checking the integrity of packages, arranged single or grouped, e.g. single-dose, and to a relative station by which the method is carried out.

DESCRIPTION OF THE PRIOR ART

The conventional machines for packaging pharmaceutical articles, in particular those prepared in an aqueous solution, include carrousel structures, defining: filling stations, in which suitable nozzles inject the product into the packages, previously withdrawn from a magazine, where they are held in vertical condition, with the bottom open and turned toward the nozzles; closing stations, where the packages are sealed at the bottom, usually by heat-welding; sorting stations, in which the so filled and sealed packages are placed on conveying belts, operated stepwise or continuously, and sent to suitable distribution centers.

The sorting stations place the packages on the conveyors releasing them from a certain height, or in other case they include turning means, which place the sealed packages on the conveyors in substantially flat configurations, taking them from the vertical configurations on the carrousel and rotating them substantially by 90°.

The integrity of the packages, previously filled and sealed, is usually verified by a visual check or by electric techniques.

In case of visual check, sample packages are taken from a plurality of packages, and then their seal and integrity are checked manually, so as to prevent product leakages from the packages at a later time.

In case of checking by electric techniques, the operator takes sample packages from a plurality of packages, and then applies a voltage to them, so that possible seal leakages are detected and measured by dielectric measures.

A big drawback of the above-mentioned checking methods derives from the problems related to the way, in which they are performed, and which do not assure the real integrity and seal of the checked containers.

Another equally important drawback relates to the type of checking, made on samples of packages, which do not assure the integrity of all the treated packages.

SUMMARY OF THE INVENTION

The object of the present invention is to propose a method fore checking the integrity of containers, in particular single-dose containers, which assures optimal checking result on seal and integrity of each examined container.

Another object of the present invention is to propose a method characterized by substantially simple and easy operation steps, which ensure high reliability standards and production rate in any working conditions.

A further object of the present invention is to propose a station, in which the proposed method is carried out, and which ensures high reliability and production rate in any working conditions, as well as the seal and integrity of each container fed to the downstream section of the station.

A still further object of the present invention is to propose a station obtained by simple and reliable devices, which can be mounted on already existing apparatuses for single-dose packages.

The above-mentioned objects are obtained, in accordance with the content of the claims, by a method for checking the integrity of packages, characterized by the steps of:

applying a reference force to said package by pressing means acting on said packages for a predetermined time interval;

detecting the value of the force transmitted by said package to force detecting means positioned so as to react to the force applied to the package;

rejecting the package when the detected force value is lower than a critical force value which is the value of the force transmitted to the force detecting means by a good package.

The method is carried out by a station for checking the integrity of packages, in particular single-dose packages, said station cooperating with conveying means, operated in a forward direction and aimed at receiving a plurality of packages thereon, characterized in that it includes first pressing means, which apply a reference force to at least one package for a predetermined time interval; and detecting means arranged opposite to said first pressing means for detecting the force transmitted by said package to the detecting means.

BRIEF DESCRIPTION OF THE DRAWINGS

The characteristic features of the present invention will be pointed out in the following description of a preferred, but not unique embodiment, with reference to the enclosed drawings, in which:

FIG. 1 is a schematic front view of a preferred embodiment of the station, in which the proposed method is performed, in a particularly significant operation step;

FIG. 2 is a schematic, top view of the station shown in FIG. 1.

BEST MODES OF CARRYING OUT THE INVENTION

The claimed method for checking the integrity of packages includes the steps of:

applying a reference force to a package (2) being tested;

detecting the value of the force transmitted by the package (2) to force detecting means (6), such as a load cell, positioned so as to react to the force applied to the package;

rejecting the package (2) when the detected force value is lower than a critical force value (f*) which is the value of the force transmitted to the force detecting means by a good package.

An apparatus carries out the method mentioned above, as follows.

With reference to the above figures, a general reference 3a indicates the upper run of a conveying belt 3, which is operated stepwise in a forward direction W, and which receives groups 20, formed by a plurality of single-dose packages 2, e.g. five packages.

According to known and not shown techniques, the packages 2 are previously filled by suitable nozzles, which inject the product, e.g. a liquid solution, through the bottom of the packages 2. After the packages 2 have been filled, their extremities E are suitably sealed by heat-welding.

For example, in the shown case, each container 2, substantially cylindrical, includes, according to known techniques, an upper head 2a, made integral with the cylindrical body 2c, and wings 2b made integral with the lateral surface of the cylindrical body 2c.

As shown in FIG. 2, the closure heads 2a and the lateral wings 2b of the adjacent packages 2, included in each group 20, are fastened to each other along the relative breaking lines 10.

It is easy to remove only one single package 2 from a group 20 by a light pressure on the relative heads 2a and the corresponding wings 2b, close to the predetermined breaking line 10.

It is also known, that the pressing force applied to the package 2, so as to compress the liquid contained therein, is not contrasted by any elastic reaction of the liquid (practically incompressible).

The applied force is contrasted in minimum part by the elastic reaction of the material of the package 2, and in maximum part by the reaction force of the support surface, i.e. by the reaction of the surface supporting the package 2; consequently, the support reaction force is practically equal to the applied force.

If the package 2 is not tight due to the presence of holes, breaks, sealing ineffectiveness, or others, the thrust force transmitted to the support surface is smaller than the applied force in relation to the entity of the above anomalies.

Consequently, it is necessary to define previously, during the calibration step, the force critical value f*, or threshold, transmitted to the constraint, as a function of an applied reference force.

Below the force critical value f*, the package 2 is considered not integral, and is therefore to be rejected.

In most cases, this threshold or critical value id determined by means of practical tests or otherwise on the basis of personal knowledge.

With reference to what above, the proposed method for checking the integrity of packages 2, in particular single-dose packages, is carried out by following these operation steps:

one group 20 of packages are places on the conveying belt 3;

a reference force is applied to the group 20 of packages 2, for a time period Dt, by a first pressing element 4 acting normally to the conveying belt 3;

the force value exerted by the group 20 on a plurality of load cells 6, whose number is e.g. equal to the number of packages 2 of each group 20, is detected. The load cells are arranged opposite to the first pressing element 4 and situated in contact and below the upper run 3a of the conveying belt 3;

the group 20 whose force value, detected by at least one load cell 6, is lower than the critical value f*, is removed from the conveying belt 3, and consequently that group 20 is rejected;

the group 20, as a consequence of detecting, by all load cells 6, of force values higher than the critical value f*, is instead accepted and consequently the integrity of the group 20 is certified.

According to a particularly advantageous embodiment, a second pressing element 5, acting orthogonal to the conveying belt 3, can apply a test force to the group 20 of packages 2 before the action of the first pressing element 4.

The operating of the second pressing element 5 for a time interval Dt* allows to stress the weak points of the packages 2 forming the group 20, thus making clearer their seal deficiencies, before the action of the first pressing element 4.

The presence of the second pressing element 5 allows also, with the same reference force applied by the first pressing element 4, to reduce the time interval Dt of the operation of the latter.

A check station SV, in which the above described method is performed, includes a first pressing element 4, which is preferably formed by a plate, acting orthogonal to the conveying belt 3, and which applies a predetermined reference force to each group 20 of packages 2 situated therebelow.

Moreover, the check station SV includes a plurality of load cells 6, which are situated opposite to the first pressing element 4, and which detect the value of the force transmitted by each group 20 to the cells, due to the action of the first pressing element 4.

The load cells, whose number is e.g. equal to the number of packages 2 of each group 20, are situated below and near the upper run 3a of the conveying belt 3.

Therefore, the groups 20 of packages 2, situated on the conveying belt 3, are acted on by the first pressing element 4, which applies thereto a predetermined reference force for a time interval Dt.

The value of the reference force applied to each group 20 is transmitted through the upper run 3a of the conveying belt 3 and is detected by the load cells 6.

If the force value detected by at least one load cell 6 is lower than the critical force value f*, predetermined during the calibration step, a pusher member 7, situated downstream of the check station SV, is operated to remove the group 20 from the conveying belt 3 and consequently to reject it.

Otherwise, if the force value detected by each load cell 6 is higher than the critical force value f*, the checked group 20 is accepted as integral and remains on the conveying belt 3.

Therefore, it is evident that the presence of seal deficiencies, which jeopardizes the integrity of only one package 2 of a group 20, causes the rejection of the whole group 20.

A correct checking of integrity of each group 20 of packages 2 is possible only if the duration of the stop on the conveying belt 3 is such to allow the reference force to be applied by the first pressing element 4 for a time sufficient for possible integrity and/or seal deficiencies of the packages 2 to become evident.

Therefore, the duration of the stop on the conveying belt 3 should be longer than the time interval Dt, in which the first pressing element 4 applies the reference force to each checked group 20.

The checking of the integrity can be improved with a simultaneous increase of the production rate, by the presence of a second pressing element 5, situated upstream of the first pressing element 4 and applying a test force to the corresponding group 20 for a time interval Dt*.

The second pressing element 5, preferably a plate, acts orthogonal to the conveying belt 3 and stresses beforehand the weak points of the packages 2 forming the group 20.

The use of a second pressing element 5 allows, with a predetermined reference force applied by the first pressing element 4, to reduce the time interval Dt of the operation of the latter.

Also in this case, the duration of the stops on the conveying belt 3 are such that the second pressing element 5 can apply the control force for a time sufficient to point out possible integrity or seal deficiencies of the packages 2; i.e. the duration of the stops must be longer than the time interval Dt*, in which the second pressing element 5 applies the test force to the corresponding group 20.

The operation of the two plates, first 4 and second 5, orthogonal to the conveying belt 3 receiving the groups 20, allows to work substantially with those parts of the forces normal to the support surface, preventing any sloping component, which could cause relative motions of the packages 2, and consequently of the groups 20, with respect to the belt 3, thus damaging the packages 2.

This assures a particularly sensitive and precise detection of the forces transmitted to the load cells 6.

In order to assure a correct and best arrangement of the groups 20, the conveying belt 3 can be equipped with a plurality of separators 3b, oriented orthogonal to the forward movement direction W and aimed at defining seats, in which the respective groups 20 are positioned firmly (FIG. 1).

The proposed method for checking the integrity of packages, especially single-dose, allows a quick and effective check, assuring the integrity and seal of the packages of the groups processed.

The operation steps, which are particularly simple and easy, are performed in a relative check station, which allows the achievement of high reliability and productivity standards in any working conditions.

The second pressing element 5, which performs a preliminary testing of the groups of packages, can be situated in the same check station, or belong to another station situated upstream with respect to the movement direction of the conveying belt.

The proposed method and corresponding station have been described with reference to the control of the integrity of groups of packages, but it is understood that they can be used also for testing single packages.

If the sorting station places packages on conveyors moved continuously, a transferring station should be mounted for locating the packages, or groups of packages, onto the described conveyor moved stepwise.

This allows checking the integrity of the packages to be tested with best result.

In this situation, the pressing elements must assume a fixed configuration, which does not change in time.

It is also possible to check the integrity of the packages positioned directly on conveying belts moved continuously, without any transferring station.

In this case, during the operation step of the pressing elements, they must be moved in such a way that they match the speed of the conveyors, at least in the intervals when the respective reference and/or test forces are applied.

It results obvious from what above, that the station, in which the proposed method is performed, can be associated also to the single-dose packaging machines already existing on the market, without particular difficulties.

It is understood that what above, has been described as a pure, not limitative example, therefore, possible variants of the invention remain within the protective scope of the present technical solution, as described above and claimed hereinafter.

The invention claimed is:

1. A method for checking the integrity of a plurality of packages (2) with a single detecting step comprising the steps of:
    using first pressing means (4) for applying a reference force to at least one package (2) for a predetermined time interval (Dt);
    detecting the value of a force transmitted by the package (2) using force detecting means (6) positioned opposite to said first pressing means (4) with respect to the package (2), the force detecting means detecting the force transmitted by the package in response to the reference force;
    rejecting the package (2) when the force transmitted byte package (2) is lower than a critical force value (f*) which is a value of the force transmitted to the force detecting means by a good package; and,
    before using said first pressing means (4) for applying the reference force, using second pressing means (5) for applying a non-detected test force to the package (2) for a time interval (Dt*) for preliminarily stressing the package (2) before using the force detecting means for detecting the value of the force transmitted by the package (2) in response to the reference force.

2. The method according to claim 1 wherein said force detecting means is at least one load cell (6).

3. The method according to claim 1 further comprising placing the packages (2) on conveying means (3) operating in a forward direction (W), situating said first pressing means (4) along said conveying means (3) and situating said force detecting means (6) under, and in contact with, said conveying means (3), in the region of said first pressing means (4).

4. The method according to claim 3 further comprising situating the second pressing means (5) near and upstream of said first pressing means (4) with respect to said forward direction (W).

5. The method according to claims 3 or 4 further comprising operating said first pressing means and said second pressing means in a direction substantially orthogonal to said conveying means (3).

6. The method according to claim 3 further comprising operating said conveying means (3) for moving said package stepwise in the forward direction.

7. A method for checking the integrity of a plurality of packages (2) comprising the steps of:
    using first pressing means (4) for applying a reference force to at least one package (2) for a predetermined time interval (Dt);
    detecting the value of a force transmitted by the package (2) using force detecting means (6) positioned opposite to said first pressing means (4) with respect to the package (2), the force detecting means detecting the force transmitted by the package in response to the reference force;
    rejecting the package (2) when the force transmitted by the package (2) is lower than a critical force value (f*) which is a value of the force transmitted to the force detecting means by a good package;
    before using said first pressing means (4) for applying the reference force, using second pressing means (5) for applying a non-detected test force to the package (2) for a time interval (Dt*) for preliminarily stressing the package (2) before using the force detecting means for detecting the value of the force transmitted by the package (2);
    placing the packages (2) on conveying means (3) operating in a forward direction (W), situating said first pressing means (4) along said conveying means (3) and situating said force detecting means (6) under, and in contact with, said conveying means (3), in the region of said first pressing means (4); and, operating said conveying means (3) for moving said package continuously in the forward direction.

8. The method according to claim 1 wherein the at least one package is a group of packages (2).

9. The method according to claim 1 wherein the at least one package is a single-dose package.

10. A station (SV) for checking the integrity of a plurality of packages (2) moving on conveying means (3) operated in a forward direction (W) comprising:
- first pressing means (4) for applying a reference force to at least one package (2) on said conveying means for a predetermined time interval (Dt);
- force detecting means (6) arranged opposite to said first pressing means (4) for detecting the value of the force transmitted by the package (2) in response to the reference force applied to the package and for determining whether the force transmitted by the package is greater then or equal to a critical force value (F*) wherein said package (2) is acceptable;
- second pressing means (5) situated upstream of said first pressing means (4) for applying a non-detected test force to said package (2) for a predetermined time interval (Dt*), the application of said test force preliminarily stressing said package (2) before said force detecting means detects said force transmitted by said package in response to the reference force applied by said first pressing means.

11. The station according to claim 10 wherein said first pressing means and said second pressing means (4,5) are operated in a direction substantially orthogonal to said conveying means (3).

12. The station according to claim 10 wherein said conveying means (3) are operated stepwise in the forward direction, said first pressing means and said second pressing means (4,5) applying said reference force and said test force for a time corresponding to a stop time between step movements of said conveying means.

13. A station (SV) for checking the integrity of a plurality of packages (2) moving on conveying means (3) operated in a forward direction (W) comprising:
- first pressing means (4) for applying a reference force to at least one package (2) on said conveying means for a predetermined time interval (Dt);
- force detecting means (6) arranged opposite to said first pressing means (4) for detecting the value of the force transmitted by the package (2) in response to the reference force applied to the package and for determining whether the force transmitted by the package is greater than or equal to a critical force value (f*) wherein said package (2) is acceptable;
- second pressing means (5) situated upstream of said first pressing means (4) for applying a test force to said package (2) for a predetermined time interval (Dt*), the application of said test force preliminarily stressing said package (2) before said three detecting means detects said force transmitted by said package in response to said first pressing means, said conveying means (3) operated continuously in the forward direction, said first pressing means and said second pressing means (4,5) moving with said conveying means while applying said reference force and said test force at a speed matching the speed of the conveying means.

14. The station according to claim 10 wherein the at least one package is a group of packages.

15. The station according to any one of claims 10 to 14 further comprising pusher means (7) situated downstream of said first pressing means (4) with respect to the forward direction (W) for removing packages from said conveying means (3) for which the force value detected by said detecting means (6) is lower than the critical force value (F*).

16. The station according to any one of claims 10 to 14 wherein said force detecting means (6) include at least one load cell (6).

17. The station according to any one of claims 10 to 14 wherein said conveying means (3) include a plurality of separators (3b), which are substantially orthogonal to said forward direction (W), which define seats for receiving said plurality of packages (2).

18. The station according to any one of claims 10 to 14 wherein said first pressing means (4) are situated along said conveying means (3) and said force detecting means (6) are situated under, and in contact with, said conveying means (3), in the region of said first pressing means (4).

* * * * *